(12) United States Patent
Eun

(10) Patent No.: US 7,433,591 B2
(45) Date of Patent: Oct. 7, 2008

(54) DIGITAL IMAGE PROCESSING APPARATUS AND METHOD OF CONTROLLING THE SAME TO PHOTOGRAPH IN USER SET CONTINUOUS PHOTOGRAPHING MODE

(75) Inventor: Sung-ho Eun, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 500 days.

(21) Appl. No.: 11/179,997

(22) Filed: Jul. 12, 2005

(65) Prior Publication Data
US 2006/0216016 A1 Sep. 28, 2006

(30) Foreign Application Priority Data
Mar. 23, 2005 (KR) ............ 10-2005-0024053

(51) Int. Cl.
*G03B 7/00* (2006.01)
(52) U.S. Cl. .................. 396/238; 396/243
(58) Field of Classification Search .......... 396/222, 396/236, 243, 238, 242, 239; 348/362
See application file for complete search history.

(56) References Cited

U.S. PATENT DOCUMENTS 4,862,205 A * 8/1989 Kawamura .......... 396/222
5,903,786 A * 5/1999 Goto .................. 396/297
2004/0130650 A1 7/2004 Lee et al.

FOREIGN PATENT DOCUMENTS

JP 2003-060982 A 2/2003

* cited by examiner

*Primary Examiner*—W. B. Perkey
*Assistant Examiner*—Rishi S Suthar
(74) *Attorney, Agent, or Firm*—Drinker Biddle & Reath LLP

(57) ABSTRACT

Provided is a method of controlling a digital image processing apparatus such as a digital camera which can continuously photograph the same subject using various setting values stored in advance, and a digital image processing apparatus. The method of controlling the digital image processing apparatus which photographs a subject according to a preset photograph setting value and records the subject as an image file on a recording medium. The method includes: storing a user setting value in which at least one of the photograph setting values is stored by assigning a user setting category for each of the photograph setting values; and continuously photographing a single subject using at least one of the photograph setting values each corresponding to the user setting categories during a single take. Thus, the subject in the same scene can be continuously photographed using the various setting values stored in advance.

19 Claims, 9 Drawing Sheets

DIGITAL IMAGE PROCESSING APPARATUS AND METHOD OF CONTROLLING THE SAME TO PHOTOGRAPH IN USER SET CONTINUOUS PHOTOGRAPHING MODE

BACKGROUND OF THE INVENTION

This application claims the priority of Korean Patent Application No. 10-2005-0024053, filed on Mar. 23, 2005 in the Korean Intellectual Property Office, the disclosure of which is incorporated herein in its entirety by reference.

1. Field of the Invention

The present invention relates to a digital image processing apparatus and a method of controlling the same, and more particularly, to a digital image processing apparatus such as a digital camera and a method of controlling the same so that images can be continuously photographed.

2. Description of the Related Art

A digital camera as an example of a conventional digital image processing apparatus, a control device of the same, and a method of controlling the digital camera are disclosed in U.S. Patent Publication No. 2004/0130650 entitled "Method of Automatically Focusing Using a Quadratic Function in Camera." The details of the digital camera, the control device, and the method of controlling the digital camera will be omitted since they are included in the detailed description of the present invention.

A conventional digital image processing apparatus supports a continuous photographing mode in which a plurality of images are continuously photographed when a shutter release button is pressed once. When photographing in the continuous photographing mode, photographing is performed using a setting value, for photographing a specific image, stored in a memory inside a system.

In addition, many users have their own preferable setting values. In this case, the user may wish to take a photograph after adjusting various settings. In particular, the user may wish to compare and analyze photographs taken of the same subject with different setting values, and select the most desirable photograph.

However, the conventional method of controlling the digital camera does not allow the user to continuously photograph the same subject while changing the setting values. That is, in the conventional method of controlling the digital camera, all the setting values have to be changed manually and then the subject must be photographed one or more time with desired setting values.

SUMMARY OF THE INVENTION

The present invention provides a digital image processing apparatus and a method of controlling the same for photographing in a continuous photographing mode so that the same subject can be continuously photographed using various preset setting values.

According to an aspect of the present invention, there is provided a method of controlling a digital image processing apparatus which photographs a subject according to a preset photograph setting value and records the subject as an image file on a recording medium. The method includes: storing at least one user specified photograph setting value by assigning a user setting category for each of the photograph setting values; and continuously photographing a single subject using at least one of the photograph setting values each corresponding to the user setting categories, during a single take.

The storing of the user specified setting includes: setting a setting value for each desired photograph setting; assigning a category to the set photograph setting value and then storing the photograph setting value; and assigning the order of the user setting categories.

Continuously photographing a single subject using at least one of the photograph setting values is performed by: selecting a user setting category for photographing; selecting the number of photographs to be taken continuously during a single take; and continuously photographing the number of photographs using the photograph setting value of the user setting category.

According to another aspect of the present invention, there is provided a digital image processing apparatus that photographs in a, user, set continuous, photographing mode using the method described above.

According to the present invention, the same subject can be continuously photographed using various preset setting values.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
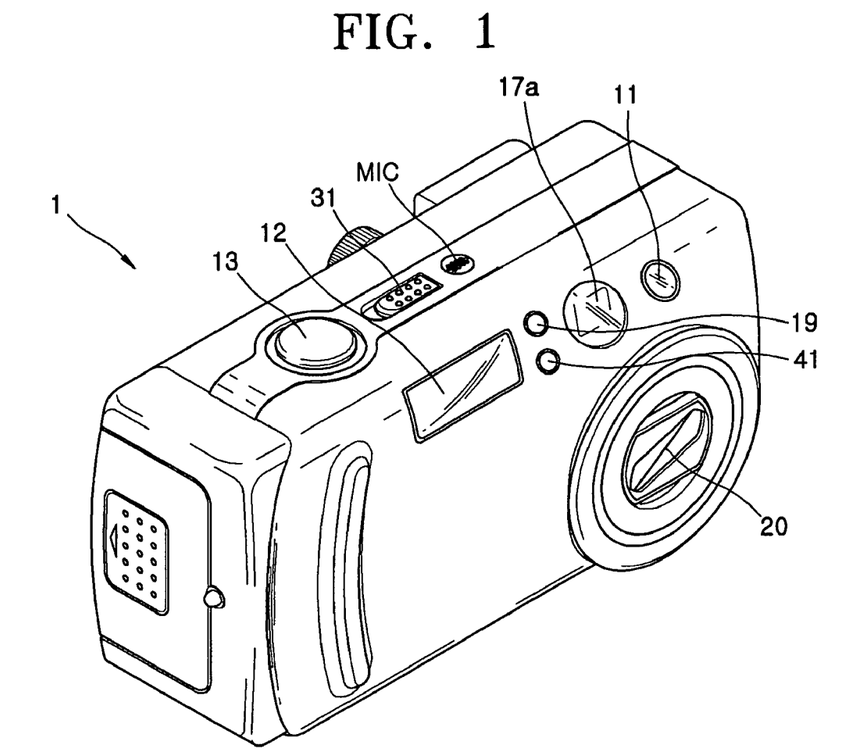
FIG. 1 is a perspective view of a digital camera as an example of a digital image processing apparatus according to an embodiment of the present invention.

FIG. 1 is a perspective view of a digital camera 1 as an example of a digital image processing apparatus according to an embodiment of the present invention.

Referring to FIG. 1, the digital camera 1 includes a self-timer lamp 11, a flash 12, a view finder 17a, a flash-light sensor (FS) 19, a lens unit 20, and a remote control receiving unit 41 on the front, and includes a microphone MIC, a shutter button 13, and a power switch 31 on the top.

The self-timer lamp 11 operates from the time when the shutter button 13 is pressed until a shutter (not shown) operates when the digital camera 1 is in a self-timer mode. The FS 19 senses the amount of flash light when the flash 12 operates and inputs the result into a digital signal processor (DSP) 507 (see FIG. 3) via a micro-controller 512 (see FIG. 3). The remote control receiving unit 41 receives a command, for example, a photograph command signal, from a remote control (not shown), and inputs the command signal into the DSP 507 via the micro-controller.

Figure 2:
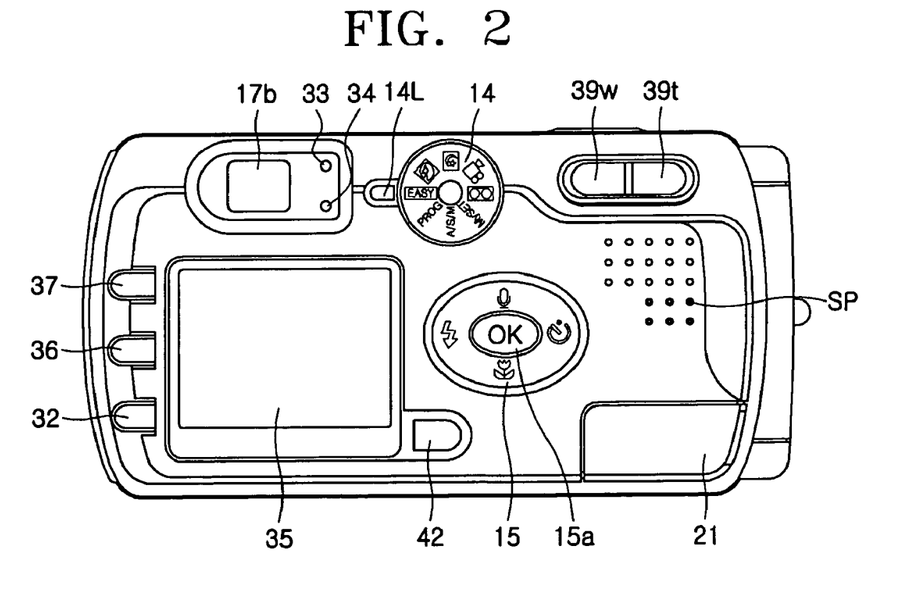
FIG. 2 is a rear view of the digital camera of FIG. 1.

FIG. 2 is a rear view of the digital camera 1 of FIG. 1.

Referring to FIG. 2, a mode dial 14, function buttons 15, a manual-focusing/delete button 36, a manual-adjusting/play button 37, a play mode button 42, a speaker SP, a monitor button 32, an automatic focus lamp 33, a view finder 17b, a flash standby lamp 34, a color liquid crystal display (LCD) panel 35, a wide-angle zoom button 39w, a telephoto zoom button 39t, and an external interface 21 are included on the back of the digital camera 1.

The mode dial 14 is used to select one of various operating modes, for example, a still image photographing mode, a night scene photographing mode, a moving picture photographing mode, a play mode, a computer connecting mode, and a system setting mode.

In particular, the mode dial 14 preferably includes a user set continuous photographing mode for performing a method of controlling the digital image processing apparatus to photograph in the user set continuous photographing mode. If a user photographs a subject after selecting the user set continuous photographing mode via the mode dial 14, a plurality of photographs of the subject can be continuously taken by pressing the shutter button 13 only once using preset user photograph setting values. The preset user photograph setting values are various setting values needed for the operation of the digital camera 1 stored in each of the user setting categories that are set by the user. That is, a plurality of photographs of a single subject can be taken using the preset user photograph setting values set in various user setting categories, thereby obtaining photographs of different qualities of the same subject.

Figure 4:
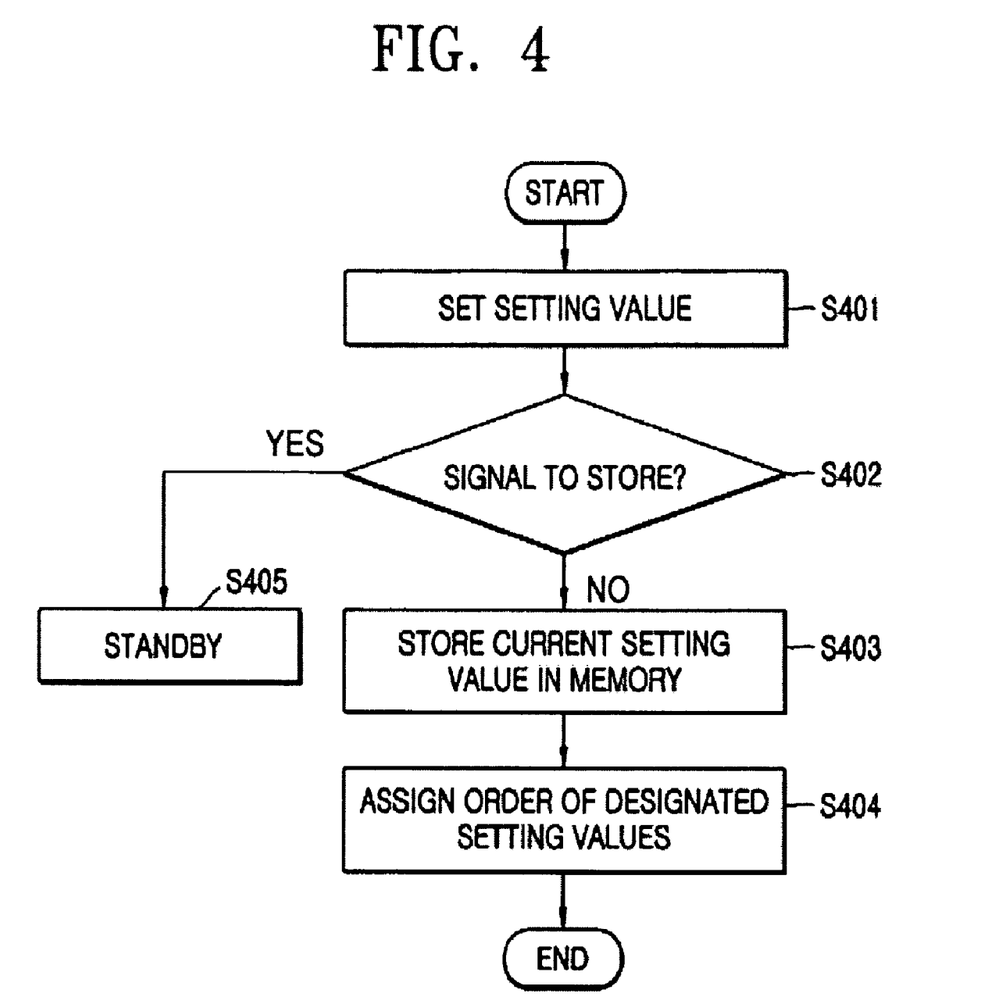
FIG. 4 is a flow chart illustrating storing operation of a user setting for a method of controlling the digital image processing apparatus to photograph in a user set continuous photographing mode according to an embodiment of the present invention.
Figure 5A:
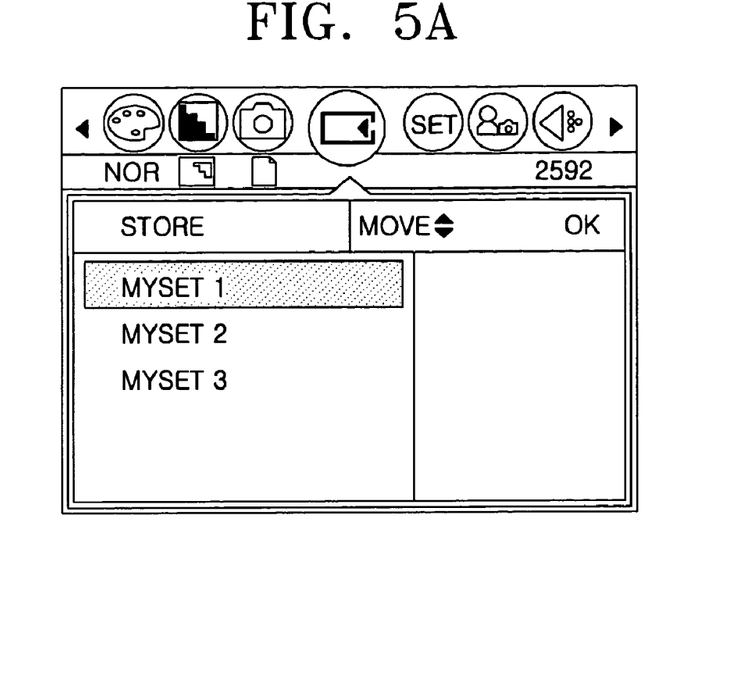
FIGS. 5A and 5B are schematic views of a menu screen for storing digital camera settings or recalling the stored digital camera settings, respectively, according to an embodiment of the present invention.
Figure 5B:
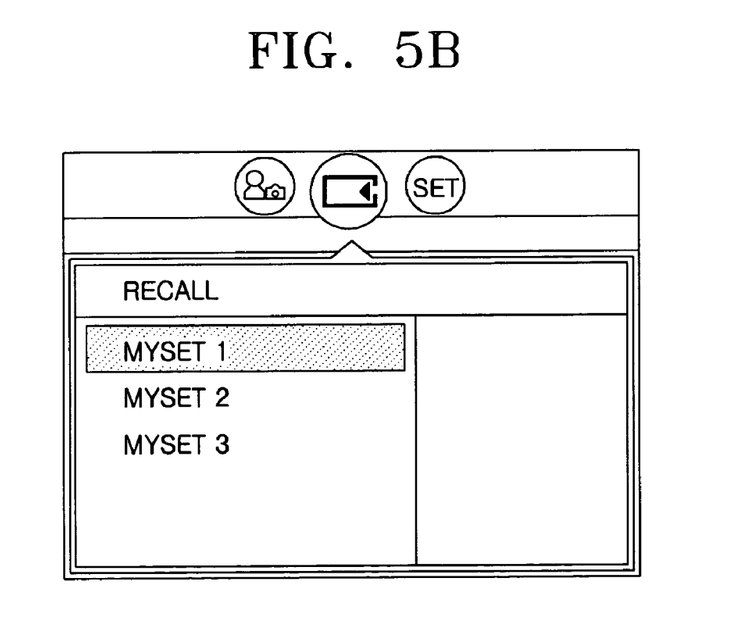
Figure 10:
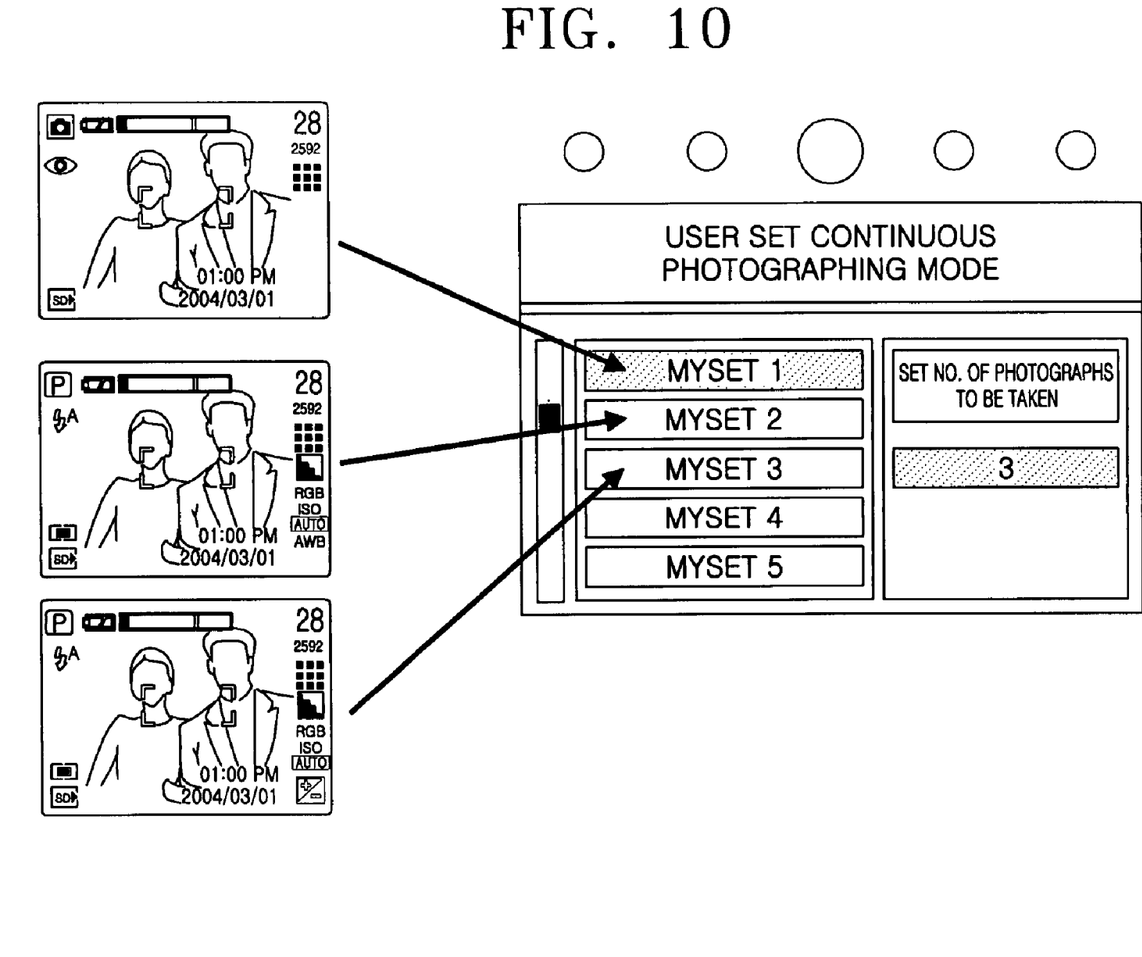
FIG. 10 is a schematic view of a user setting screen used in the selection of the user set continuous photographing mode mentioned in FIG. 7.

Here, the user photograph setting value can be stored using the algorithm illustrated in FIG. 4. To do this, an exemplary menu screen for storing the user photograph setting values in user setting categories MYSET 1, MYSET 2, and MYSET 3 is illustrated in FIG. 5A, and an exemplary menu screen to recall the preset user photograph setting value is illustrated in FIG. 5B. Alternatively, it is possible to recall the preset user photograph setting value from a menu screen of the user set continuous photographing mode as illustrated in FIG. 10.

Here, the user photograph setting value stored in the user setting categories MYSET 1, MYSET 2, and MYSET 3, may be setting values for the operation of the digital camera 1 or setting values for achieving various photographic effects with the photographs.

The function buttons 15 are used to select specific operating modes of the digital camera 1 as well as direction movement buttons. Here, a menu screen can be manipulated using the function buttons 15, and the user photograph setting values of the user setting categories MYSET 1, MYSET 2, and MYSET 3 can be stored or recalled by manipulating the menu screen. In addition, an OK button 15a, which is at the center of the function buttons 15, can be used as a hot key to store the current setting values as a user setting category without additional manipulation of the menu.

The manual-focusing/delete button 36 is used to manually focus the subject or delete the photographs. The manual-adjusting/play button 37 is used to manually adjust specific conditions, and to stop or play an image file when the digital camera 1 is in a play mode. The play mode button 42 is used to change to a photograph mode or to change back to the play mode.

The monitor button 32 is used to control the operation of the color LCD panel 35. For example, when the user presses the monitor button 32 for the first time, an image of a subject and photographing information of the image is displayed on the color LCD panel 35, when the monitor button 32 is pressed for the second time, power supplied to the color LCD panel 35 is blocked in the photograph mode. In addition, when the user presses the monitor button 32 for the first time while an image file is being played, photographing information of the image file being reproduced is displayed on the color LCD panel 35, and when the monitor button 32 is pressed for the second time, only the image file is displayed in the play mode.

While in the play mode, the photographing information of the currently playing image file can be stored in one of the user setting categories, which is for setting a future photographing condition, when the user presses the monitor button 32 for more than one second. Accordingly, even if the user did not store the photographing information when the he/she photographed the subject, the same photographing information can be reused as a photographing condition. This operation will be described in more detail below.

The automatic focus lamp 33 operates when the subject is well-focused. The flash standby lamp 34 operates when the flash 12 (see FIG. 1) is in standby. A mode indicating lamp 14L indicates a mode selected by the mode dial 14.

Figure 3:
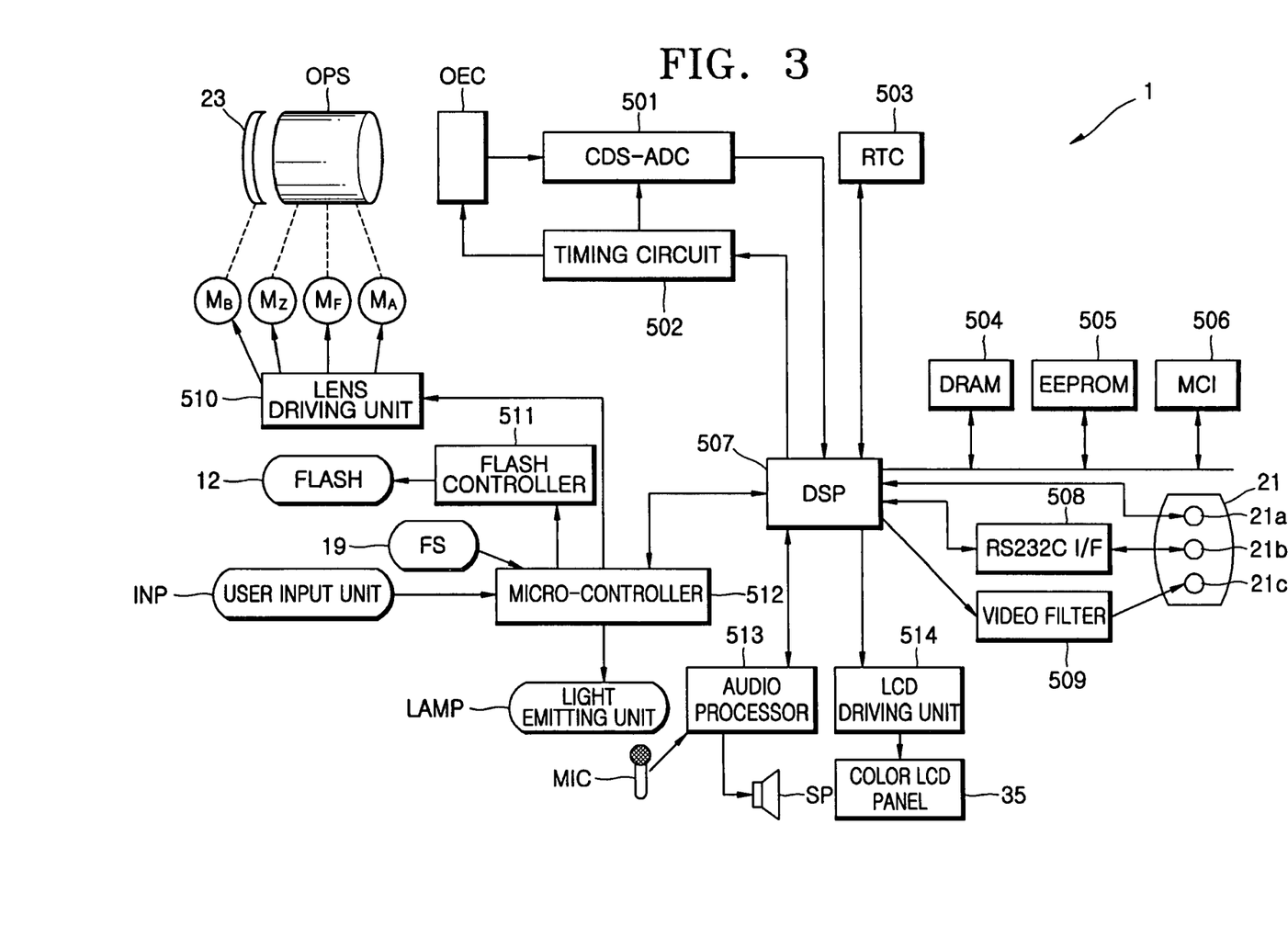
FIG. 3 is a block diagram of a controlling device of the digital camera of FIG. 1.

FIG. 3 is a block diagram of a controlling device of the digital camera 1 of FIG. 1. Referring to FIGS. 1 through 3, the overall structure and operations of the digital camera 1 is as follows.

A transparent barrier 23 for preventing adhesion of foreign substances on an optical system (OPS) is opened or closed by a barrier motor $M_B$. The OPS including the lens unit 20 and a filter unit (not shown) optically processes light reflected from a subject. The lens unit includes a zoom lens (not shown), a focus lens (not shown), and a compensating lens (not shown).

If the user presses the wide-angle zoom button 39w or the telephoto zoom button 39t included in a user input unit INP, a signal corresponding to the wide-angle zoom button 39w or the telephoto zoom button 39t is input to the micro-controller 512. Accordingly, as the micro-controller 512 controls a lens driving unit 510, a zoom motor $M_Z$ operates, thereby moving the zoom lens. That is, if the wide-angle zoom button 39w is pressed, the focal length of the zoom lens is shortened, which increases a viewing angle. Conversely, if the telephoto zoom button 39t is pressed, the focal length of the zoom lens is lengthened, which decreases a viewing angle. Since the location of the focus lens is adjusted while the location of the zoom lens is set, the viewing angle is hardly affected by the location of the focus lens.

In an automatic focus mode, a main controller embedded in the DSP 507 controls the lens driving unit 510 via the micro-controller 512, and thus drives a focusing motor $M_F$. Accordingly, the focus lens moves from the very front to the very back, and in this process, the position of the focus lens having a largest high frequency component of an image signal, for example, the number of driving levels of the focus motor $M_F$ is set.

The compensating lens is not separately operated since it acts to compensate the overall refractive index. Reference character $M_A$ denotes a motor for driving an aperture (not shown).

An optical low pass filter (OLPF) included in the filter unit of the optical system OPS removes high frequency optical noise. An infrared cut filter (IRF) included in the filter unit blocks an infrared component of the incident light.

A photoelectric converter OEC of a charge coupled device (CCD) or complementary metal oxide semiconductor (CMOS) (not shown) converts light from the optical system OPS into an electrical analog signal. Here, the DSP 507 controls a timing circuit 502 and controls the operation of the photoelectric converter OEC and an analog-to-digital converter (ADC). A correlation double sampler and analog-to-digital converter (CDS-ADC) 501, which is an example of the ADC, processes the analog signal from the photoelectric converter OEC, and converts them into a digital signal after removing high frequency noise and altering their bandwidth. A real time clock (RTC) 503 provides time information to the DSP 507. The DSP 507 processes the digital signal output from the CDS-ADC 501, and generates a digital image signal divided into a chrominance signal and a luminance signal.

A light emitting unit LAMP operated by the micro-controller 512 according to the control of the main controller embedded in the DSP 507 includes the self-timer lamp 11, the automatic focus lamp 33, the mode indicating lamp 14L, and the flash standby lamp 34. The user input unit INP includes the shutter button 13, the mode dial 14, the function buttons 15, the monitor button 32, the manual-focusing/delete button 36, the manual-adjusting/play button 37, the wide-angle zoom button 39w, and the telephoto zoom button 39t.

The digital image signal from the DSP 507 is temporarily stored in a dynamic random access memory (DRAM) 504. Algorithms needed in the operation of the DSP 507 and setting data are stored in an electrically erasable and programmable read-only memory (EEPROM) 505. A memory card of a user is inserted into or removed from a memory card interface (MCI) 506.

The digital image signal output from the DSP 507 is input to an LCD driving unit 514. As a result, an image is displayed on the color LCD panel 35.

The digital image signal output from the DSP 507 can be transmitted as a serial signal via a universal serial bus (USB) connector 21a or an RS232C interface 508 and its connector 21b, or can be transmitted as a video signal via a video filter 509 and a video outputting unit 21c. Here, a micro-controller is embedded in the DSP 507.

An audio processor 513 outputs an audio signal from the microphone MIC to the DSP 507 or the speaker SP, and outputs an audio signal from the DSP 507 to the speaker SP.

Meanwhile, the micro-controller 512 controls the operation of a flash controller 511 according to a signal output from the FS 19, and thus operates the flash 12.

In addition, the method of controlling the digital image processing apparatus to photograph in the user set continuous photographing mode according to the present embodiment can be performed by a control device of a digital image processing apparatus like the one illustrated in FIG. 3. The main algorithm of the method can be performed inside the DSP 507 or the micro-controller 512 with the help of peripheral components of the control device according to the present embodiment.

In the method of controlling the digital image processing apparatus for photographing in the user set continuous photographing mode performed in such control device, a subject is photographed according to a preset photograph setting value and recorded as an image file on a recording medium. The method includes a user setting storing operation (see FIG. 4) in which at least one photograph setting value is stored by assigning a user setting category for each of the photograph setting values and a continuous photographing operation (see FIG. 6) in which at least one photograph is taken continuously of the same subject according to each of the photograph setting values corresponding to the user setting categories during a single take. The user setting storing operation and the continuous photographing operation will be described with reference to the example illustrated in FIGS. 4 through 10.

The user setting storing operation is illustrated in FIGS. 4, 5A, 5B, and 10. FIG. 4 is a flow chart illustrating the user setting storing operation in the method of controlling the digital image processing apparatus to photograph in the user set continuous photographing mode according to an embodiment of the present invention, FIGS. 5A and 5B are schematic views of a menu screen for storing the digital camera setting or recalling the stored digital camera setting, respectively, according to an embodiment of the present invention, and FIG. 10 is a schematic view of a user setting screen used in the selection of the user set continuous photographing mode mentioned in FIG. 7.

Referring to FIGS. 4, 5A, 5B, and 10, in the user setting storing operation, at least one photograph setting value is stored by assigning a user setting category to it. The user setting storing operation includes setting a photograph setting value (S401), storing the photograph setting value (S403), and assigning an order (S404). In (S403), one user setting category is assigned to the set photograph setting value and then the photograph setting value is stored. In S404, the order of the user setting categories is set.

The photograph setting value (S401), according to the stored user setting categories MYSET 1, MYSET 2, and MYSET 3 may be a combination of individual settings regarding the operation of the digital camera 1 and various functions for giving photographic effects to the photographs. Examples of individual setting values that may be included in the photograph setting value include macro, flash, white balance, ISO, aperture value, shutter speed, resolution, quality of the images, intensity of light, photographic effects, sharpness, night scene photographing mode, scene photographic mode, and a continuous photographing mode. A photograph setting value is set by setting each of the individual setting values desired for a photograph. These setting values can also be used for the operation of the digital image processing apparatus and for setting various functions to achieve image effects besides those setting values enumerated above. Details of the setting values for each of the setting values enumerated above are described in, and thus should be referred to, the user's manual of Kenox α5 manufactured by Samsung, who is the applicant of the present application.

In addition, normal setting values for the individual setting values enumerated above are preset in a common digital camera, and the user can set and store at least one of the normal setting values among the preset setting values, in which case only the newly set setting value set by the user can be changed and stored. According to an embodiment, a photograph setting value according to the normal setting values for automatic photographing can be set in a user setting category.

In the storing of the photograph setting value (S403), the user setting category is assigned and then the photograph setting value is stored. To do this, first, it is determined whether a signal to store the current setting value is input from the outside (S402). If storing of the current setting value is not selected, the storing of the setting value (S403) is not performed and the digital camera 1 goes into a standby mode (S405), and if the storing of the current setting value is selected, the storing of the setting value (S403) is performed.

The menu screen for storing the user photograph setting value according to the user setting categories MYSET 1, MYSET 2, and MYSET 3 to store the setting values is illustrated in FIG. 5A, and the menu screen for recalling the user photograph setting values stored in advance is illustrated in FIG. 5B. As an other embodiment, it is also possible to store and recall the user setting from the menu screen of the user set continuous photographing mode as illustrated in FIG. 10.

Referring to FIG. 10, various functions of the operation and effects of the digital camera 1 are respectively set and selected, user setting categories MYSET 1, MYSET 2, and MYSET 3 are assigned for each of the settings, and then the current setting values are stored in a memory. Here, in the assigning of the setting categories, the photograph setting values can be automatically set as the next setting category of the currently stored setting category if the user selects storing of the current photograph setting values. The user setting category is designated while the order of the user setting categories, photographed in the user set continuous photographing mode, is assigned. Thus, the storing of the setting value (S403) can be performed together with the next operation, which is assigning the order of the user setting categories (S404). Here, the order of the user setting categories can be designated by assigning numbers to MYSET (e.g. MYSET 1, MYSET 2, and MYSET 3) as in the menu screen illustrated in FIG. 10.

According to the present embodiment, the menu screens illustrated in FIGS. 5A and 5B can be used to store or recall user settings when the user set continuous photographing mode is not selected.

In this case, when an event to store the user photograph setting values occurs, the current state is stored in a specific memory buffer inside the control device illustrated in FIG. 3. Here, if there are setting values of the previously stored user setting categories, the setting values of the current state is stored in the next area of the memory.

In step S404, the order of the user setting categories is set. The order of the user setting categories can be designated by assigning the order in which photographs are to be taken in the user set continuous photographing mode to the stored user setting categories. In the present embodiment, the order of the user setting categories can be designated by assigning numbers to MYSET (e.g., MYSET 1, MYSET 2, and MYSET 3) shown on the menu screen in FIG. 10. Here, the setting status of the digital camera 1 is preferably stored in the order in the memory.

Figure 6:
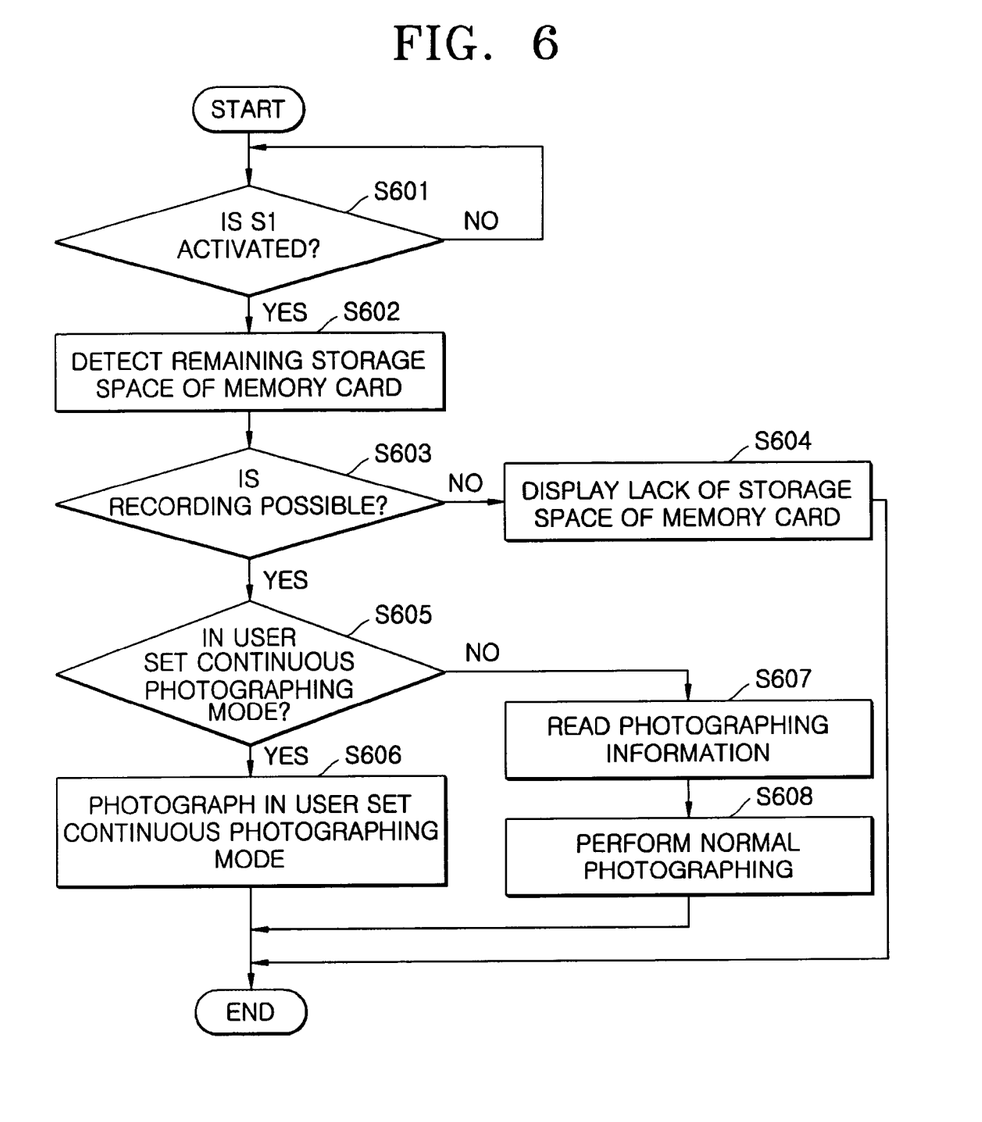
FIG. 6 is a flow chart illustrating an algorithm for photographing an image in a continuous photographing mode of the method of controlling the digital image processing apparatus according to an embodiment of the present invention.

FIG. 6 is a flow chart illustrating an algorithm for photographing an image in a continuous photographing mode of the method of controlling the digital image processing apparatus according to an embodiment of the present invention.

First, the shutter button 13 included in the user input unit INP has a two level structure. That is, if a user presses the shutter button 13 up to a first level after the user operates the wide-angle zoom button 39w or the telephoto zoom button 39t, a first signal S1 output from the shutter button 13 is activated, and if the shutter release button 13 is pressed up to a second level, a second signal S2 output from the shutter button 13 is activated. Therefore, the photographing algorithm illustrated in FIG. 6 starts when the user presses the shutter button 13 up to the first level (S601). Here, the present location of the zoom lens is already set.

The remaining storage space of the memory card is detected (S602), and it is determined whether the storage space is sufficient to record a digital image (S603). If there is not enough storage space, a message indicating a lack of storage space in the memory card is displayed (S604). If there is enough storage space, the following operations are performed.

Figure 7:
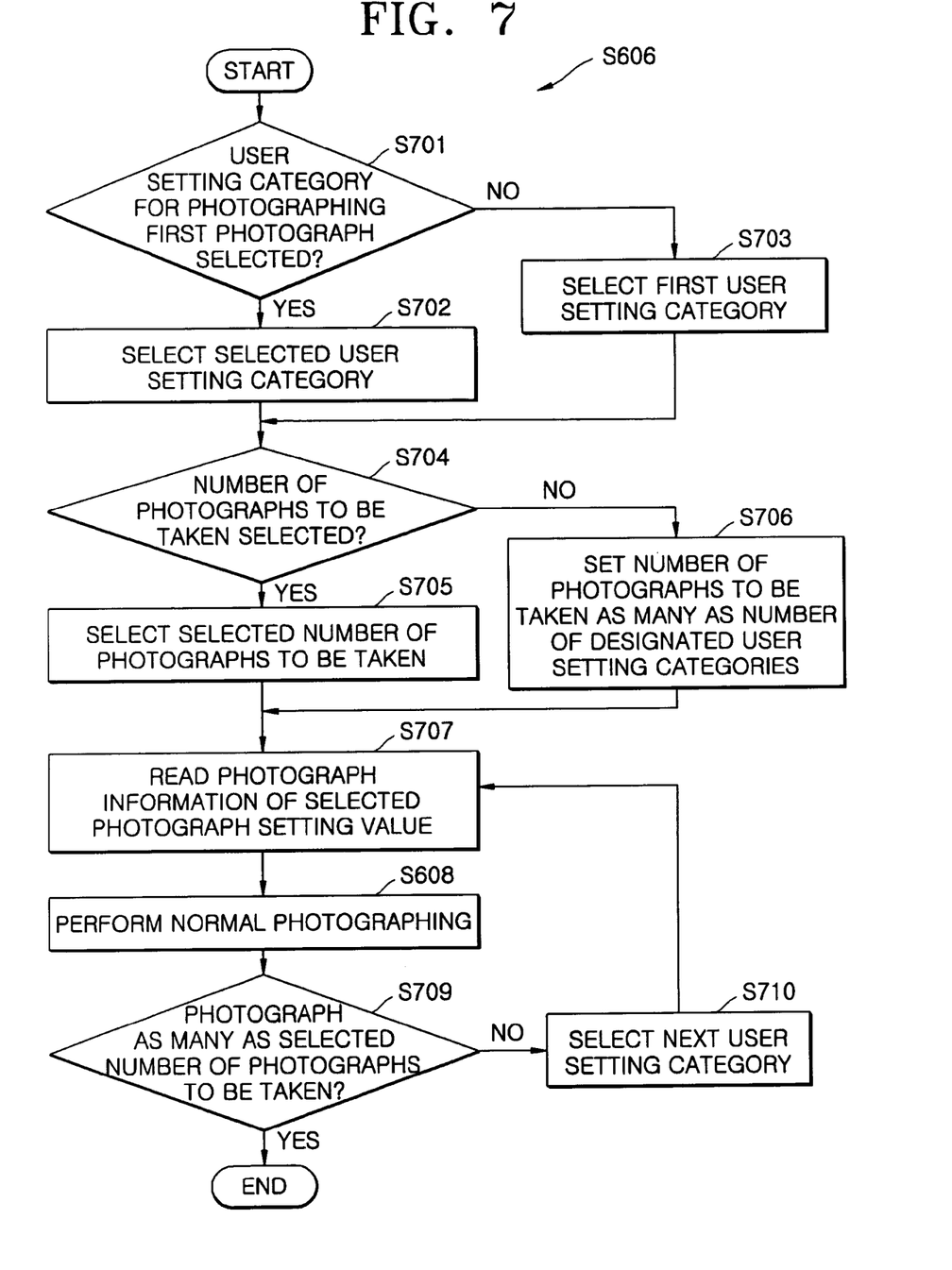
FIG. 7 is a flow chart illustrating an algorithm for performing a user set continuous photographing mode mentioned in FIG. 6.
Figure 8:
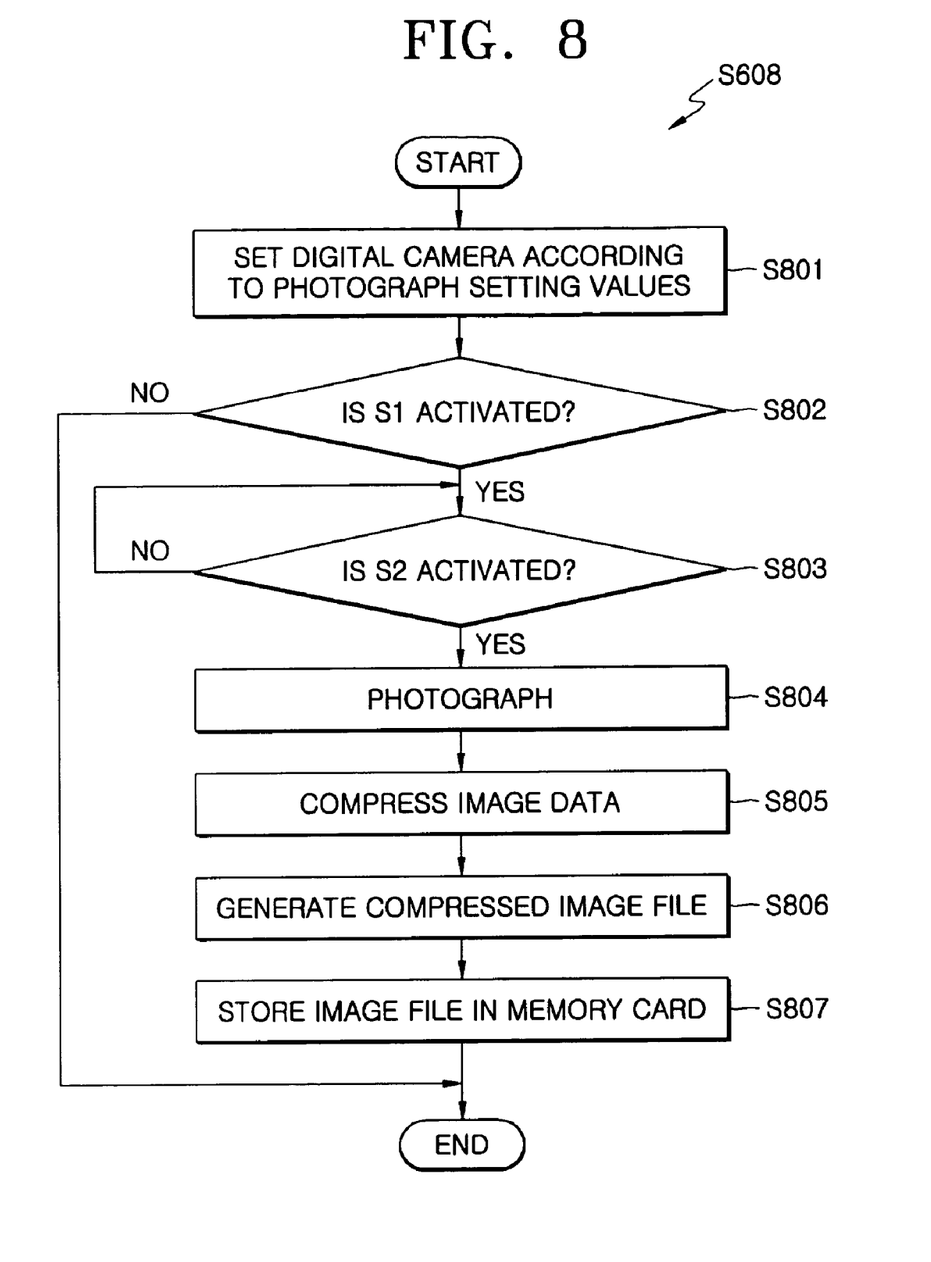
FIG. 8 is a flow chart illustrating an algorithm for performing normal photographing mentioned in FIGS. 6 and 7.

It is determined whether the digital camera 1 is in the user set continuously photographing mode (S605). If the digital camera 1 is in the user set continuously photographing mode, the user set continuously photographing mode illustrated in FIG. 7 is performed (S606), and if not, photographing information according to the current setting or a selected setting value is read (S607) and then the normal photographing illustrated in FIG. 8 is performed (S608). The photographing algorithm performed in the normal photographing will be described in more detail with reference to FIG. 8.

In the reading of the photographing information (S607), an automatic white balance (AWB) mode is performed and parameters related to the AWB mode are set. Also, an automatic exposure (AE) mode is performed in which a brightness of incident light is calculated, and an aperture driving motor MA is operated according to the calculated brightness amount. In addition, an automatic focusing (AF) mode is performed to set the location of the focus lens. Furthermore, other photographing information is read to perform normal photographing.

FIG. 7 is a flow chart illustrating the algorithm for performing the user set continuous photographing mode (S606) in FIG. 7.

Referring to FIG. 7, in the performing of the user set continuous photographing mode (S606), at least one photograph is taken of the same subject according to each of the photograph setting values corresponding to the user setting categories during a single take. The photographs are taken using each of the photograph setting values corresponding to the user setting categories according to the order of the user setting categories assigned in the storing of the user setting.

The performing of the user set continuous photographing mode (S606) includes selecting a first user setting category, selecting the number of photographs to be taken, and a photographing operation. In the selecting of the first user setting category, a user setting category for photographing a first photograph is selected. In the selecting of the number of photographs to be taken, the number of photographs to be taken continuously of the same subject in a single take is selected. In the photographing operation, photographing of the subject begins with the photograph setting value of the first user setting category and the same subject is continuously photographed as many times as the set number of photographs to be taken.

In S701 a determination is made as to whether the user setting category for photographing the first photograph is selected, and if the user setting category for photographing the first photograph is selected, selecting the photographing information corresponding to the selected user setting category (S702). If the user setting category for photographing the first photograph is not selected, the user setting category for photographing the first photograph is selected by the photographing information corresponding to the user setting category that is first to be stored (S703). Here, if the user setting category for photographing the first photograph is not selected, it is possible to set an automatic photographing mode stored in the normal setting as the first user setting category.

In the selecting of the number of photographs to be taken, the number of photographs to be taken continuously of the same subject in a single take is selected. First, it is determined whether the number of photographs to be taken is selected (S704). If the number of photographs to be taken is selected, the selected number of photographs is the number of photographs to be taken continuously (S705), but if the number of photographs to be taken is not selected, the number of stored user setting categories can be the number of photographs to be taken continuously (S706). Here, if the selected number of photographs to be taken is higher then the number of stored user setting categories, the number of stored user setting categories is the number of photographs to be taken continuously.

In the photographing operation, photographing of the subject begins with the photograph setting value of the first user setting category and is continuously performed as many times as the set number of photographs to be taken.

Preferably, the photographing operation includes photographing the subject using the photographing information set in the photograph setting value corresponding to the first user setting category, and photographing the subject using the photographing information set in the photograph setting value corresponding to the next user setting category if the number of photographs to be taken is smaller than the selected number of photographs to be taken.

To photograph, first, there is read the photographing information set as the photograph setting value according to the user setting category for photographing the first photograph (S707), and then the normal photographing as illustrated in FIG. 8 is performed (S608). Here, the subject is photographed using the photographing information set as the photograph setting value corresponding to the first user setting category. FIG. 8 shows details regarding the photographing algorithm performed in the normal photographing (S608).

Next, it is determined whether the normal photographing is performed as many times as the set number of photographs (S709), and photographing in the user set continuous photographing mode is terminated if the normal photographing is performed as much as the set number of photographs. Here, if the normal photographing is not performed as many times as the set number of photographs to be taken, that is, if the number of continuously taken photographs is smaller than the selected number of photographs to be taken, the subject is photographed using the photographing information set as the photograph setting value corresponding to the next user setting category. To do this, first, the photograph setting value of the next user setting category is selected (S710), the photographing information of the selected photograph setting value is determined (S707), then the normal photographing is performed (S608). By such algorithm, the normal photographing is performed as many times as the set number of photographs to be taken (S608), and the same subject is continuously photographed as many times as the set number of photographs during a single take. As a result, the set number of photographs can be obtained during a single take.

FIG. 8 is a flow chart illustrating the algorithm for performing the normal photographing (S608) mentioned in FIGS. 6 and 7.

Referring to FIG. 8, first, the AWB mode is performed and the parameters related to the AWB mode are set according to the photographing information read in the reading of the photographing information (S607 of FIG. 6 and S707 of FIG. 7). Then, the AF mode is performed according to the photographing information read in the reading of the photographing information (S607 of FIG. 6 and S707 of FIG. 7) and the aperture driving motor $M_A$ is driven, and the AF mode is performed and the current location of the focus lens is set. In addition, other settings needed to operate the digital camera 1 and give photographic effects are performed according to the photographing information read in the reading of the photographing information (S607 of FIG. 6 and S707 of FIG. 7).

Then, it is determined whether the first signal S1 output from the shutter release button 13 is activated (S802). If the first signal S1 is not activated, the photographing operation is terminated since the user has no intention of photographing. If the first signal S1 is activated, the following operations are performed.

It is determined whether the second signal S2 is activated (S803). If the second signal S2 is deactivated, the digital camera 1 does not move on to the next operation and is in standby since the user has not yet pressed the shutter button 13 up to the second level to photograph a subject. If the second signal S2 is activated, the user has pressed the shutter button 13 up to the second level, and thus the photographing operations are performed (S804). That is, the DSP 507 controls the operation of the timing circuit 502, thereby operating the OEC and the CDS-ADC 501.

Then, image data is compressed (S805) and an image file is generated (S806). The image file is stored in the user's memory card via the MCI 506 (S807), and then the normal photographing is terminated.

Figure 9:
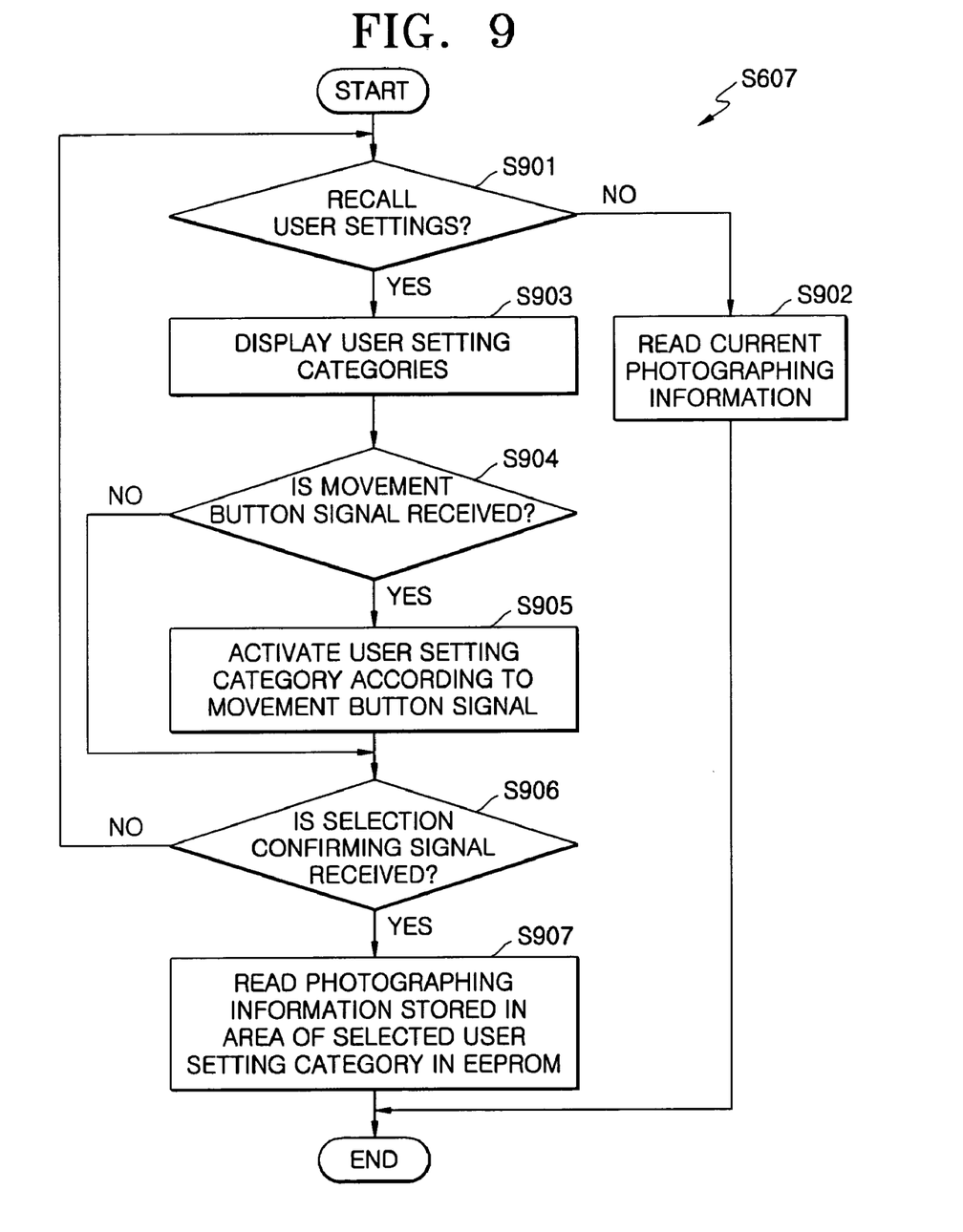
FIG. 9 is a flow chart illustrating an algorithm for reading photographing information mentioned in FIG. 6.

FIG. 9 is a flow chart illustrating the algorithm for reading the photographing information mentioned in FIG. 6.

The algorithm for the reading of the photographing information (S607) to perform the normal photographing (S608) when the digital camera 1 is not in the user set continuous photographing mode will be described referring to FIG. 9. First, it is determined whether the selected mode indicated by the mode indicating lamp 14L among the modes of the mode dial 14 is a user setting mode "MYSET" (S901). If the user setting mode is not selected, the current photographing information is read (S902). If the user setting mode is selected, the following operations are performed.

First, the user setting categories are displayed as illustrated in FIG. 5B (S903). Then, if a movement button signal is output from one of the function buttons 15 (S904), a user setting category selected by the movement button signal is activated (S905).

Next, if a selection confirming signal is output from the OK button 15a (S906), photographing information stored in an area of the selected user setting category in the EEPROM 505 is read (see FIG. 3).

According to a digital image processing apparatus and a method of controlling the same, the same subject can be continuously photographed using various setting values stored in advance.

In addition, various setting values can be set to photograph a single subject and then after photographing the single subject with the various setting values, the photographs taken of the same subject with different setting values can be compared and analysed.

Furthermore, the most desired photograph can be selected from among the photographs taken with various setting values of the same subject, and thus a photograph with a desired quality can be obtained more easily.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital image processing apparatus which photographs a subject according to preset setting values and records the subject as an image file on a recording medium, the method comprising:
   receiving user input of setting values for each user setting category in a plurality of user setting categories;

storing the plurality of setting values in the plurality of user setting categories;

taking a plurality of photographs in succession of a single subject using only the user setting categories; and simultaneously with the taking step, cycling automatically through each user setting category of the plurality of user setting categories such that each photograph of the plurality of photographs is taken with setting values of a different user setting category of the plurality of user setting categories.

2. The method of claim 1, further comprising detecting whether the user has selected a first user setting category of the plurality of user setting categories with which to start photographing and if the first user setting category is not selected, using an automatic photographing mode as the first user setting category.

3. The method of claim 1, wherein each user setting category in the plurality of user setting categories is assigned an order by the user which designates the order in which the user setting categories are cycled through when taking the plurality of photographs in succession.

4. The method of claim 1, wherein the setting values are photographic effects.

5. The method of claim 1, wherein at least one of the plurality of user setting categories is comprised of at least one normal setting value for automatic photographing.

6. The method of claim 3, wherein the order is a numerical order.

7. The method of claim 1 wherein the taking step comprises:

selecting a first user setting category for photographing a first photograph;

selecting a number of photographs to be taken in succession; and triggering a switch one time to photograph the number of photographs to be taken wherein the first photograph is taken using setting values of the first user setting category.

8. The method of claim 1 further comprising:

detecting whether the user has selected a user setting category of the plurality of user setting categories with which to start photographing; and wherein the cycling step begins with a default category if none of the plurality of user setting categories has been selected b the user.

9. The method of claim 7, further comprising photographing a single subject in succession as many times as the number of user setting categories in the plurality if the selected number of photographs to be taken is greater than the number of user setting categories.

10. A method of controlling a digital camera which photographs a subject according to preset setting values and records the subject as an image file on a recording medium, the method comprising:

receiving user input of a plurality of non-exposure setting values;

assigning a subset of non-exposure setting values of the plurality of non-exposure setting values to a user setting category;

repeating the receiving and assigning steps to define a plurality of user setting categories;

selecting a first user setting category of the plurality with which to start photographing;

selecting a number of photographs to be taken; and taking a plurality of photographs in succession based on the selected number, wherein each photograph of the plurality of photographs is taken using different subsets of non-exposure setting values of a different user setting category of the plurality of user setting categories.

11. The method of claim 10, further comprising storing the plurality of user setting categories.

12. The method of claim 11, further comprising recalling the plurality of user setting categories that have been stored.

13. The method of claim 10, further comprising photographing the subject using the non-exposure setting values contained in a next user setting category if the number of photographs taken is less than the selected number of photographs to be taken.

14. The method of claim 10 wherein if the number of photographs to be taken is greater than the number of user setting categories in the plurality of user setting categories, the number of photographs taken in succession is equal to the number of user setting categories.

15. A digital image processing apparatus for photographing a subject according to preset setting values and recording the subject as an image file on a recording medium, the apparatus comprising:

a user input device for inputting a plurality of groups of setting values;

a memory for storing the plurality of groups of setting values in a plurality of user-defined, photographic categories, wherein each group of the plurality of groups of setting values corresponds to a single user-defined, photographic category of the plurality of user-defined, photographic categories;

a mechanism for selecting one user-defined, photographic category of the plurality of the user-defined, photographic categories to take successive photographs of a single subject;

a device to trigger successive photographs of a single subject; and a control module for controlling the apparatus to successively take a plurality of photographs, the control module sequentially and automatically recalling each user-defined, photographic category of the plurality and controlling photographing using the recalled plurality of categories in a sequence they are recalled so that each photograph of the plurality has a different setting value.

16. The apparatus of claim 15 wherein each of the plurality of user-defined, photographic categories is assigned a positional order in relation to the other user-defined, photographic categories in the plurality wherein the positional order determines the sequence of categories used to take the successive photographs.

17. The apparatus of claim 15, wherein the setting values are photographic effects.

18. The apparatus of claim 15 further comprising a screen for displaying and selecting the user-defined, photographic categories.

19. The apparatus of claim 15 wherein the digital processing apparatus is a camera.

* * * * *